United States Patent [19]
Davies

[11] Patent Number: 5,324,377
[45] Date of Patent: Jun. 28, 1994

[54] PULTRUSION METHOD INCLUDING TRANSVERSE FIBERS

[75] Inventor: Lawrence W. Davies, Winnipeg, Canada

[73] Assignee: Omniglass Ltd., Winnipeg, Canada

[21] Appl. No.: 969,301

[22] PCT Filed: Aug. 19, 1991

[86] PCT No.: PCT/CA91/00285
§ 371 Date: Feb. 16, 1993
§ 102(e) Date: Feb. 16, 1993

[87] PCT Pub. No.: WO92/03277
PCT Pub. Date: Mar. 5, 1992

Related U.S. Application Data

[63] Continuation-in-part of Ser. No. 568,140, Aug. 16, 1990, abandoned.

[51] Int. Cl.⁵ .............................................. B29C 67/14
[52] U.S. Cl. .................................. 156/180; 156/166; 156/242; 156/441; 156/433; 264/136; 264/137; 264/134; 264/174; 264/257
[58] Field of Search ............... 156/166, 180, 242, 276, 156/279, 314, 441, 433; 264/174, 136, 137, 257, 134

[56] References Cited

U.S. PATENT DOCUMENTS

| | | |
|---|---|---|
| 3,702,356 | 11/1972 | Hall . |
| 3,769,127 | 10/1973 | Goldsworthy . |
| 3,993,726 | 11/1976 | Moyer . |
| 4,058,581 | 11/1977 | Park . |
| 4,296,060 | 10/1981 | Killmeyer . |
| 4,680,224 | 7/1987 | O Connor . |
| 4,695,404 | 9/1987 | Kwong . |
| 4,820,366 | 4/1989 | Beever et al. . |
| 5,120,380 | 6/1992 | Strachan .................. 156/180 X |

FOREIGN PATENT DOCUMENTS

| | | |
|---|---|---|
| 0281130 | 9/1988 | European Pat. Off. . |
| 63-31741 | 2/1988 | Japan . |
| 1176794 | 1/1970 | United Kingdom ................ 156/180 |

*Primary Examiner*—Jeff H. Aftergut
*Attorney, Agent, or Firm*—Adrian D. Battison; Murray E. Thrift; Stanley G. Ade

[57] ABSTRACT

Transverse fibers are added to a pultruded part by forming a body of fibers and resin in a first die part which body is dimensioned smaller than that of the die through which the body is to be passed. A fluid including cut fibers is then applied under pressure to the body just upstream of the die so that cut fibers become integrated with the body into the spaces defined in the body. The continuous fibers, the cut fibers, and the resin are then passed through the die and become integrated into a pultruded part with the transverse cut fibers providing a transverse strength.

12 Claims, 3 Drawing Sheets

PULTRUSION METHOD INCLUDING TRANSVERSE FIBERS

This application is a continuation in part of U.S. application Ser. No. 568,140 filed Aug. 16, 1990 and now abandoned.

This invention relates to a method of pultruding parts including the reinforcement of the part with some longitudinally continuous fibers and some transverse fibers.

Pultrusion is a well known technique in which longitudinally continuous fibers are collated into a required shape, saturated with a resin and passed through a die in which the resin sets. The force to transmit the fibers and the resin through the die is applied as a pulling action downstream of the die on the finished set part. In many cases although not necessarily the resin is thermo setting and the fibers are glass fibers provided in rovings in which each fiber is continuous and extends longitudinally.

Some pultruded parts consist wholly of longitudinally fibers provided by the rovings. Other parts and particularly more complex parts require additional strength in the transverse direction since the tendency of the rovings or longitudinal fibers to split apart in the transverse direction does not provide sufficient transverse strength for the required complex part. The conventional technique is to apply in addition to the rovings a proportion of mat which comprises a plurality of fibers laid in generally random pattern in a two dimensional form with a bonding material to hold the fibers in the two dimensional pattern. The mat is then required to be slit to a required width for the part concerned and is then applied onto the part generally as an outer layer by bending and forming the mat to wrap around the already shaped rovings. The mat and the finished part provides fibers which extend transversely to the longitudinal direction and accordingly provide strength in the transverse direction.

The mat has however a number of serious problems which interfere with the efficiencies and economics of the pultrusion process.

Firstly, the mat is a rather expensive item relative to the cost of rovings in view of the additional operations necessary for the forming of a two dimensional mat, the additional bonding material and also the slitting and waste from slitting all of which significantly increased the cost.

Secondly, the mat is difficult to form into the required shapes. Thicker and stronger mats are available but these tend to be very stiff and very difficult to bend often in view of the heavy bonding layer so it is almost necessary to crack the bonding layer or binder before the bending action can take place. Hence is of course very difficult to bend the layer into complex shapes and to ensure that the shapes are held while the material enters the die.

Lighter weight mats are easier to form but then often have insufficient transverse strength in the finished part. In addition this lighter weight mat can have insufficient pull strength wet or dry to enter the die and accordingly can be pushed longitudinally and torn at the entrance to the die.

The choice of mat is therefore a compromise between the necessity for bending and the required strength and this of course seriously limits the effectiveness of the pultrusion action.

More recently mats have become available which are needled in a direction at right angles to the normal two dimensional form of the mat so as to provide loops which cooperate with the rovings and also to form a mat structure which is less dependent upon a bonding layer to provide necessary pull strength. This mat has a tendency to stretch and is very expensive thus seriously interfering with the economics of the pultrusion process.

U.S. Pat. No. 4,058,581 (Park) discloses an attempt to attach discontinuous fibers to the longitudinally continuous fibers by simply adding these into the bath of resin so that they maybe picked up by the longitudinal fibers as they pass through the resin. There is no statement that this leads to a layer of transverse fibers on the part and it is believed that any fibers so attached would simply be pulled straight and longitudinal by passage through the die.

It is one object of the present invention, therefore, to provide an improved method of pultrusion in which it is no longer necessary to apply a mat to obtain the transverse fiber orientation necessary for the required transverse strength of a part.

According to the invention, therefore, there is provided a method of forming a fiber reinforced part comprising collating a plurality of longitudinally continuous fibers to form a body of fibers applying a resin to the body upstream of the die, causing the body to pass through a die member in a longitudinal direction so as that the resin is set as it passes through the die member, applying a pulling force to the set resin and fibers downstream of the die member so as to pull the body into the die member, characterized by the steps of a) prior to the body entering the die member, passing the body through a first die part, the shape of which is arranged such that as the body approaches the die member there is defined on the body at least one part of the body shaped differently from a shape defined by the die member to leave a space between that part of the body and the die member, b) prior to any substantial setting of any resin in the body taking place, applying to the body between the first die part and the die member a fluid comprising a resin settable with the body in the die member and a plurality of cut fibers dispersed within the resin, c) attaching the cut fibers to the body in orientations at least some of which have portions transverse to the longitudinal direction and;

d) causing the body to transport the attached cut fibers with the body through the die member.

The transverse fibers are therefore provided to the part in a slurry which includes chopped or cut fibers in random orientation throughout the slurry embedded within a resin which is also settable within the die. The longitudinal fibers are passed with the saturating resin through the first die part having a dimension less than that of the die so that the slurry is applied to the outer surface of the pre-shaped part as the part enters the die. A suitable pressure can preferably be applied to the slurry so as to force it with the part into the entrance of the die for transportation with the part. The amount of pressure is sufficient to drive the slurry into the die. In order to also strengthen the part at one or more locations particularly corners between the wall parts within the body of the part, spaces can preferably be formed between the longitudinal bundles of fibers or rovings so these spaces are also filled with the slurry which has transverse fibers and hence transverse strength.

Preferably the flow of slurry containing the fibers, within a chamber applying the slurry just before the die, is controlled to cause the fibers to attach to the body transversely to the length of the body. This can be achieved by bleed holes for the resin provided in the first die part.

The invention therefore has the advantage that firstly there is no mat which needs to be shaped and automatically the slurry will conform to the shape of the part since the slurry itself has no initial retained shape from which it must be deformed.

Secondly the slurry is relatively inexpensive in that it is formed simply by mixing cut fibers into the conventional resin in a suitable mixing chamber generally on site.

Thirdly the thickness can be varied or tailored to the specific strength requirement of the part including different thickness at different locations on the other part.

One or more embodiments of the invention will now be described in conjunction with the accompanying drawings.

Figure 1:
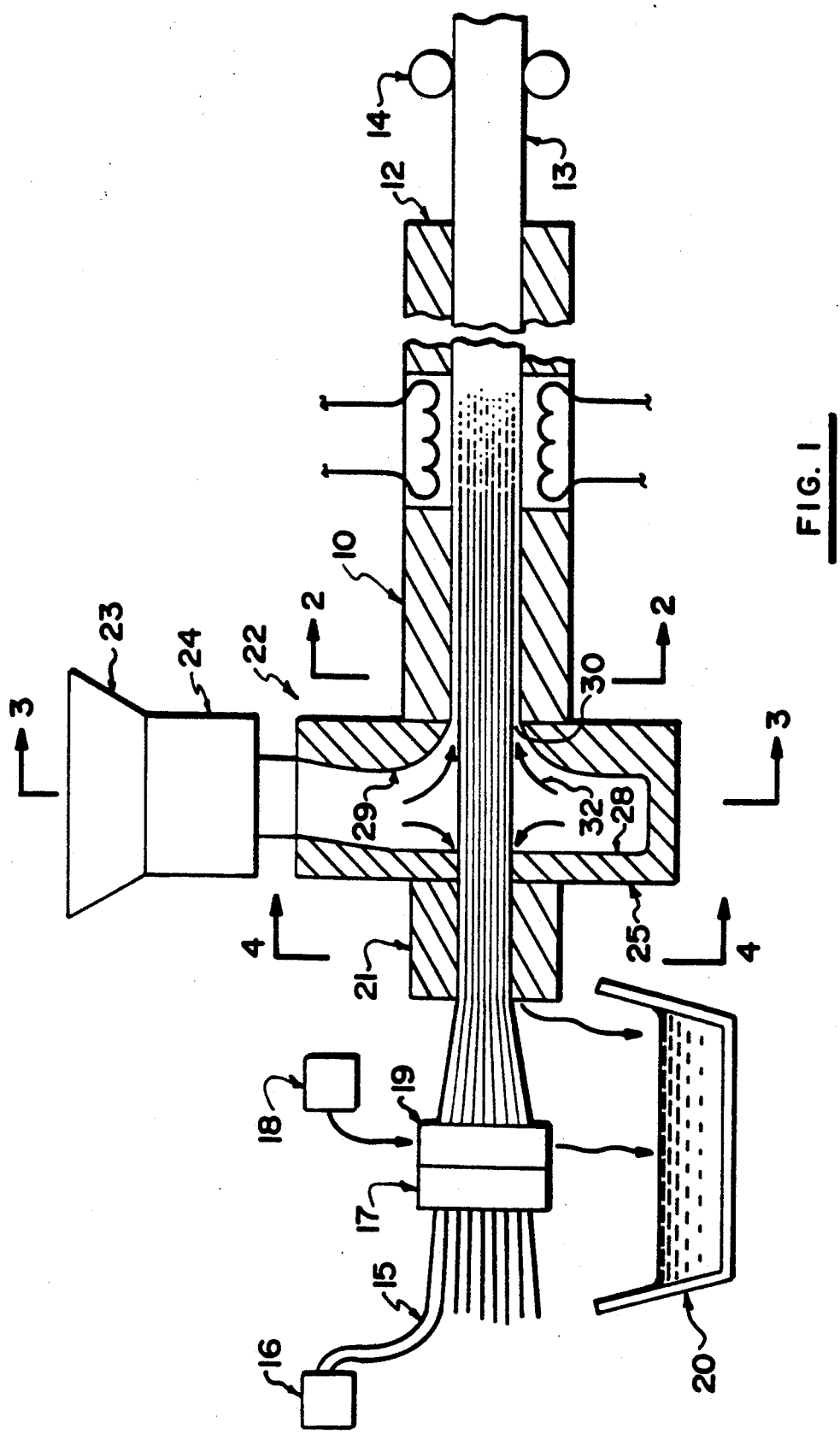
FIG. 1 is a longitudinally cross sectional view showing schematically a pultrusion method according to the present invention.

The apparatus in FIG. 1 includes a pultrusion die indicated at 10 including heating elements 11 by which the resin passing through the die is heated and thus heat set emerging from the downstream end 12 of the die as a finished part 13 drawn from the die by a pulling system schematically indicated at 14. The fiber reinforcement for the resin is provided by a plurality of longitudinally continuous fibers indicated at 15 and supplied in the form of a plurality of rovings from individual packages 16. The apparatus includes schematically illustrated a pre-shaping system for the rovings indicated at 17 and a system for saturating the rovings with resin supplied from a container 18 and applied to the rovings by an arrangement indicated at 19. The pre-shaping and saturation of the rovings is well known and used in the conventional pultrusion technique. Various arrangements are available for carrying out this process and accordingly these are well known to one skilled in the art and do not require detailed description here. Schematically there is also indicated a container 20 for receiving excess resin spilled from the saturation device 19 and from the inlet of a first die part 21.

Relative to a conventional pultrusion system, the present apparatus is modified by the addition of the first die part 21 and also a slurry application system indicated generally at 22. The system 22 includes a container 23 for receiving and mixing a slurry which comprises a resin which may be similar to or the same as the resin in the container 17 together with a plurality of chopped or discontinuous fibers. The fibers are cut to a length by a system (not shown) and introduced into a bath 23 of the resin and mixed to form a homogeneous mass of the resin and fibers with the fibers randomly oriented in all directions due to the mixing process. The fibers can have a length in the range ½ to 2 inches and all the fibers can be the same length or can be cut to random lengths as required. The fibers are preferably formed of the same material as the rovings and often this will be glass although other materials can be used. The length of the fibers is preferably greater than 0.75 inches as this has been found to provide the most effective attachment of the fibers in the transverse orientation as described hereinafter.

The system 22 further includes a high pressure pump 24 which carries the slurry from the container 23 into an application vessel 25. The vessel 25 is generally cylindrical in shape thus defining an internal cylindrical wall 26 at one portion of which is attached a mouth 27 leading from the pump 24 so that the vessel is filled with the slurry. One end wall 28 of the vessel is substantially flat and has an opening therein shaped to attach to the first die part.

A front wall 29 of the vessel converges in a conical manner in an axial direction toward the mouth of the die 10 thus tending to lead the slurry toward the mouth indicated at 30 of the die.

Figure 2:
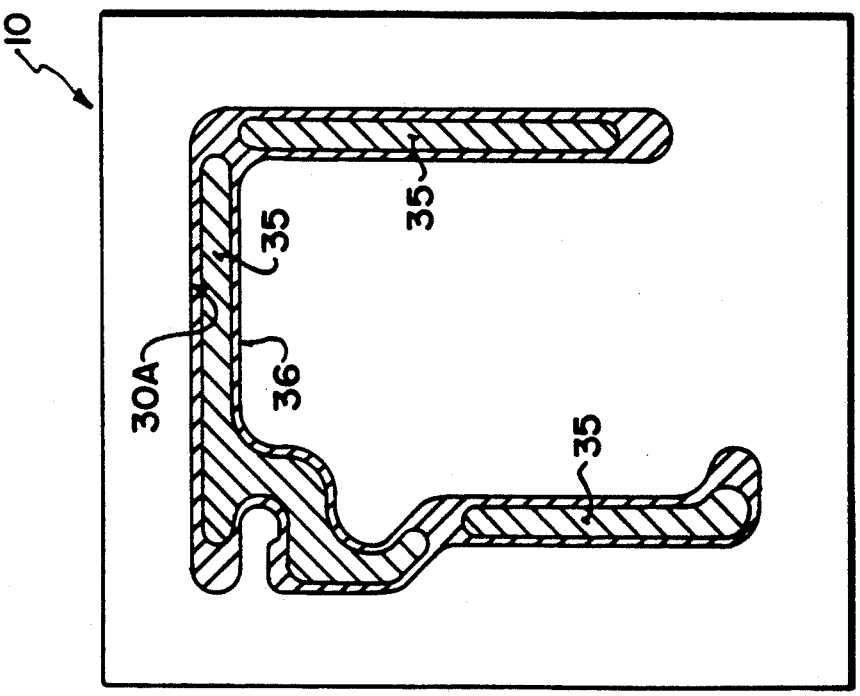
FIG. 2 is a cross sectional view along the lines 2—2 of FIG. 1.

The rear wall of the chamber 25 is thus defined by a front face of the first die part 21 (shown in cross section in FIG. 4) and the front wall of the chamber is defined by the rear face of the die 10 (shown in cross section in FIG. 2). Suitable fastening arrangement for the die parts to the chamber will be well apparent to one skilled in the art and have thus been omitted from the drawings.

Figure 3:
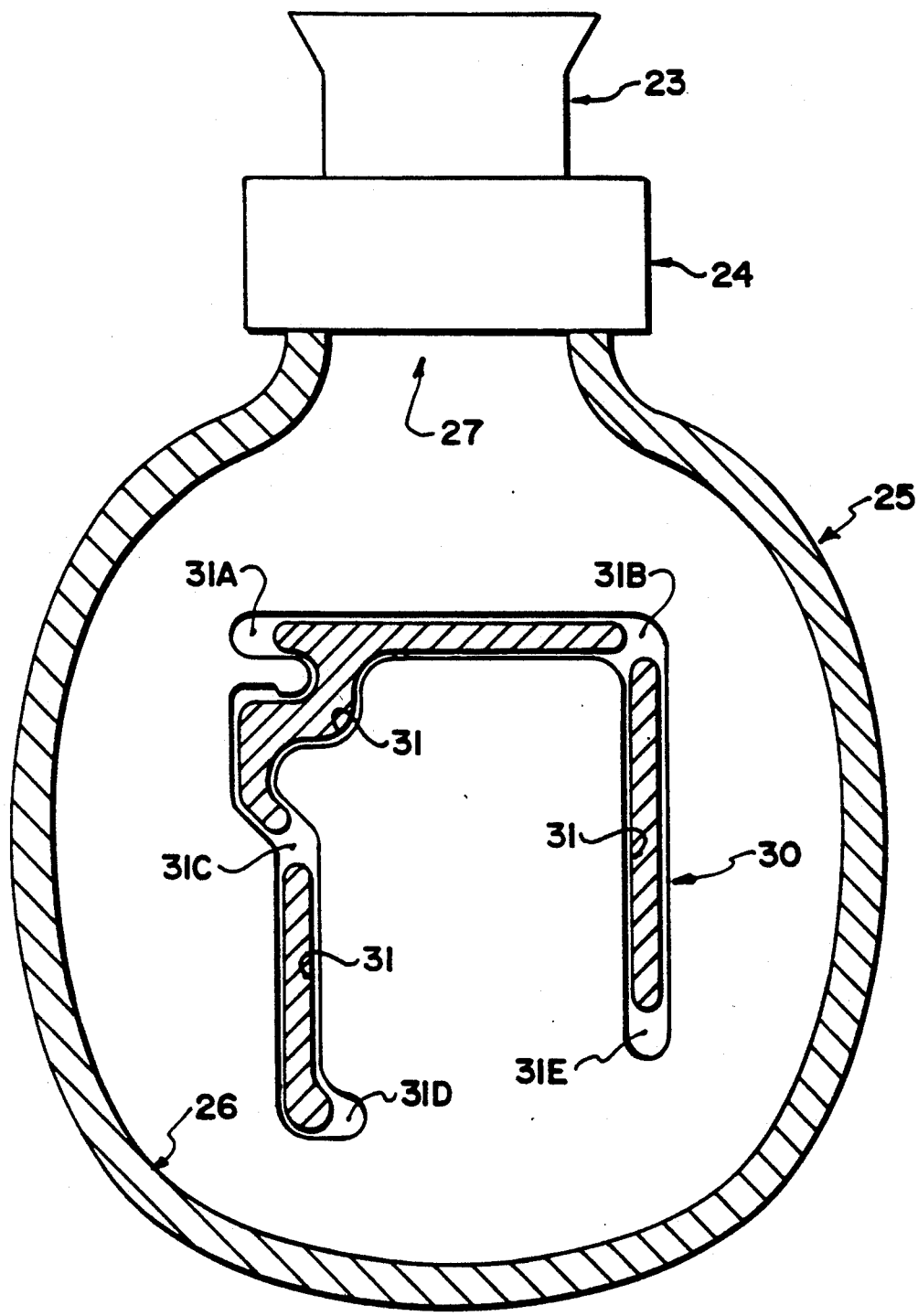
FIG. 3 is a cross sectional view along the lines 3—3 of FIG. 1.

Referring now to FIG. 3, the mouth 30 of the die is shaped to define a certain pattern for the part which of course varies according to requirements. The first die part 21 defines a pattern which is similar in shape to the pattern of the die but is slightly smaller. Thus in FIG. 3 the mouth of the die indicated at 30 and the pattern formed by the pre-shaper indicated at 31 leaving a narrow band substantially fully around the outside of the pre-shaped part as it enters the mouth 30. In addition the part preshaped by the first die part includes portions omitted to leave spaces between sections of the part, four such spaces being indicated at 31A, 31B, 31C, 31D and 31E. This narrow band and the spaces are then filled by the slurry which moves along the arrows indicated at 32 from the vessel into the narrow space between the outside periphery of the part and the interior surface of the die. As the part is fully surrounded by the slurry and the pressure within the slurry generated by the pump 24 is applied to all the slurry, the slurry tends to enter equally around all parts of a periphery of the pre-shaped part as it enters the die thus retaining the pre-shaped part centrally of the die and applying a substantially constant layer of the slurry around the part as it enters the die. The pressure in the vessel generated by the pump 24 is arranged to be sufficient to force the slurry into the die to travel along the die with the pre-formed part until the action of the die causing setting of both resin materials allows the part to be completely and fully formed as an integral part to be pulled from the die by the pulling system 14.

FIG. 2 shows the cross section of the die with the interior wall 30A and the cross section of the part. The part, includes the pre-formed portion defined by the longitudinal rovings 35 and the outside portion of the part defined by the band 36 around the rovings. The band 36 is formed from the slurry and thus includes fibers which are oriented in substantially random and transverse directions so as to include some transverse fiber or fibers which have a part of their length transverse to provide transverse reinforcement strength to the part.

Figure 4:
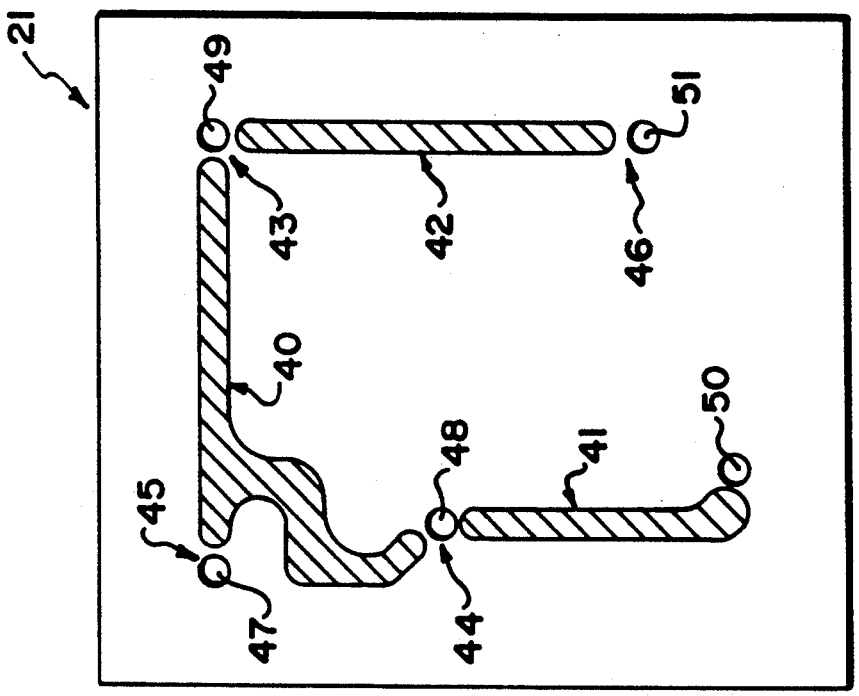
FIG. 4 is a cross sectional view along the lines 4—4 of FIG. 1.

The first die part 21 has a die shape as shown in FIG. 4. This die shape is intended for the manufacture of a channel shaped body with a flange and two depending legs. The die shape includes a first transverse body portion 40 and two depending legs 41 and 42 which are separated by spaces 43 and 44 and includes spaces at the end indicated at 45 and 46. The die shape thus forms only part of the shape of the intended article as shown in the cross section of FIG. 2 in that the shape of the parts 40, 41 and 42 is smaller than the finished part by a dimension of the order of 0.015 to 0.030 inches to provide a space for receiving the discontinuous fibers.

In addition the spaces in which there is no initial part as defined by the first die part 21 are intended to be wholly filled with the transverse fibers for the additional strength and these spaces are defined particularly at corners for example the corner between the body parts or wall parts 40 and 42.

In addition to the openings through the first die part which define the shape of the preformed part, there are additional openings 47, 48, 49, 50 and 51 which act as bleed holes. Thus these openings are left entirely free from longitudinal fibers passing therethrough and thus form openings connecting the chamber 25 to the exterior. The resin under pressure therefore can pass through these openings in a reverse direction relative to the normal flow of the resin to exit from the rear face of the first die part 21 to return to the bath 20.

In the example shown the openings are positioned within the contour of the intended finished part but this arrangement is not essential and the openings can be provided at other locations.

The purpose of the bleed openings is to allow the resin to pass from the chamber in a flowing action in a direction rearwardly of the movement of the part. The bleed openings are dimensioned so that the fibers tend not to pass through these openings but allow simply the resin itself to escape. This flow of the resin thus tends to cause fibers to spread across two of the openings so that the fibers have one end at one of the openings and an opposed end at another of the openings so as to lie generally transverse to the length of the part. The transverse fibers then attach to the longitudinal fibers as they are moving forwardly and are drawn into the die. As the fibers are drawn into the die in a transverse orientation, it is much less likely that one end of the fiber is drawn first with the remainder of the fiber being caused to extend longitudinally of the part as a occurs if the fibers are merely present in a bath and are attached randomly.

The chamber is therefore designed to cause a flow of the fibers and resin in a manner which attaches the fibers to the part in a preferentially transverse orientation so that the fibers then preferentially remain in that transverse orientation and are less likely to extend longitudinally of the part, in which case they would provide no transverse strength.

As shown in FIG. 2, therefore, the finished part includes longitudinal fibers in the part 35 which have previously been shaped by the first die part in the elements 40, 41, and 42. The remainder of the finished part is formed from the transverse fibers with these transverse fibres forming a thin coat over the outside surfaces of the portion 35 and thicker parts at the corners or ends of the portion 35 to provide additional strength at these areas.

I claim:

1. A method of forming a fiber reinforced part comprising providing a die member, collating a plurality of longitudinally continuous fibers to form a body of fibers, applying a resin to the body upstream of the die member, causing the body to pass through the die member in a longitudinal direction so as that the resin is set as it passes through the die member, applying a pulling force to the set resin and fibers downstream of the die member so as to pull the body into the die member, and including the steps of
    a) prior to the body entering the die member, passing the body through a first die part, the shape of which is arranged such that as the body approaches the die member there is defined on the body at least one part of the body shaped different from a shape defined by the die member to leave a space between that part of the body and the die member,
    b) prior to any substantial setting of any resin in the body taking place, applying to the body between the first die part and the die member a fluid comprising a resin settable with the body in the die member and a plurality of cut fibers dispersed within the resin,
    c) attaching the cut fibers to the body in orientations at least some of which have portions transverse to the longitudinal direction and;
    d) causing the body to transport the attached cut fibers with the body through the die member.

2. The method according to claim 1 wherein the fluid is applied under pressure.

3. The method according to claim 1 wherein the pressure is applied at an entrance to the die such that the fluid is forced into the die at the space under the pressure.

4. The method according to claim 1 wherein the body has a plurality of surfaces and wherein the body is shaped by the first die part so that each surface is spaced from a corresponding surface of the die such that the cut fibers are applied from the fluid to each of the surfaces of the body.

5. The method according to claim 1 wherein longitudinally continuous fibers are formed by the first die part into groups of fibers and wherein there are provided a plurality of spaces each between a group of fibers and a next adjacent group of fibers such that the cut fibers enter the spaces between the groups.

6. The method according to claim 1 wherein the cut fibers have a length in the range 0.5 to 2 inches.

7. The method according to claim 1 wherein said fluid is applied to the body separately from the application of said resin thereto and wherein the resin is applied prior to the passage of the body through the first die part.

8. The method according to claim 5 wherein the body includes two walls arranged at an angle to define a corner therebetween and wherein the first die part is shaped to form a space at said corner to be filled with said cut fibers and to form across each wall a space thinner than the wall to apply a thin layer of said cut fibers thereacross.

9. The method according to claim 1 including causing said fluid to flow in the area between said first die part and the die member so as to deposit said cut fibers on said body in an orientation having at least a component transverse to said longitudinal direction.

10. The method according to claim 9 including providing bleed holes allowing resin to escape from said area to deposit said fibers in said orientation.

11. The method according to claim 10 wherein said area is formed by a chamber having said die member as a front wall and said first die part as a rear wall and wherein said bleed holes are provided in said first die part.

12. The method according to claim 11 wherein the body includes two walls arranged at an angle to define a corner therebetween and wherein a bleed hole is formed at said corner.

* * * * *